(12) United States Patent
Park

(10) Patent No.: US 9,412,026 B2
(45) Date of Patent: Aug. 9, 2016

(54) INTELLIGENT VIDEO ANALYSIS SYSTEM AND METHOD

(71) Applicant: ITX-M2M CO., LTD., Seoul (KR)

(72) Inventor: Dong Uk Park, Gwangmyeong-si (KR)

(73) Assignee: ITX-M2M CO., LTD., Seoul (KR)

( * ) Notice: Subject to any disclaimer, the term of this patent is extended or adjusted under 35 U.S.C. 154(b) by 0 days.

(21) Appl. No.: 14/753,531

(22) Filed: Jun. 29, 2015

(65) Prior Publication Data

US 2016/0004914 A1    Jan. 7, 2016

(30) Foreign Application Priority Data

Jul. 1, 2014    (KR) .......................... 10-2014-0082085

(51) Int. Cl.
*G06K 9/00* (2006.01)
*G06K 9/62* (2006.01)

(52) U.S. Cl.
CPC .......... *G06K 9/00771* (2013.01); *G06K 9/6201* (2013.01); *G06K 9/6267* (2013.01)

(58) Field of Classification Search
CPC ..... H04N 7/181; H04N 7/18; G06K 9/00771; G06K 9/00335; G06T 2207/10016; G06T 2207/30232; G06T 7/20; G08B 13/19613; G08B 13/19645; G08B 21/0423
See application file for complete search history.

(56) References Cited

U.S. PATENT DOCUMENTS

| 2011/0231419 | A1* | 9/2011 | Papke et al. .................... 707/756 |
| 2012/0066707 | A1* | 3/2012 | Poder et al. .................... 725/14 |
| 2012/0147179 | A1  | 6/2012 | Kim et al. |
| 2014/0009384 | A1* | 1/2014 | Valik et al. .................... 345/156 |

FOREIGN PATENT DOCUMENTS

| JP | 2004-118534 A | 4/2004 |
| KR | 10-2012-0065817 A | 6/2012 |

* cited by examiner

*Primary Examiner* — Edward Park
(74) *Attorney, Agent, or Firm* — NSIP Law

(57) ABSTRACT

The present disclosure relates to an intelligent video analysis system and method and, more specifically, an intelligent video analysis system and method which provides an event by analyzing data acquired from a camera and a smart device. The an intelligent video analysis system and method system selects information by temporally and spatially matching information received from a camera and a smart device, determines based on the selected information whether a security event-relevant condition is satisfied, generates Customer Relationship Management (CRM) information, and outputs the CRM information and a security event, which is generated from the selected information.

4 Claims, 8 Drawing Sheets

INTELLIGENT VIDEO ANALYSIS SYSTEM AND METHOD

CROSS-REFERENCE TO RELATED APPLICATION(S)

This application claims priority from Korean Patent Application No. 10-2014-0082085, filed on Jul. 1, 2014, in the Korean Intellectual Property Office, the entire disclosure of which is incorporated herein by reference for all purposes.

BACKGROUND

1. Field

The following description relates to an intelligent video analysis system and method and, more particularly, to a system and method for analyzing and providing data acquired from a camera and a smart device.

2. Description of the Related Art

Due to a growing demand for security, a countless number of cameras have been set up in many places. Since too many cameras are set up in a unit area, it requires a great deal of human resources and administrative burden to monitor all the data from the cameras.

The existing technology is used in a manner where, if a security sensor detects opening a door, breaking a window, a person's entrance, and the like, an event occurs and an image captured at that timing is managed. However, a sensor is able to detect only limited types of events, so that security staff still needs to focus and monitor videos.

Along with the development of a video processing technology, video analysis has been introduced in the security domain to identify an event by analyzing a video captured by a device, such as a camera. For example, video analysis is applied to analyze an image captured by a camera and detect movement in the image or to extract and analyze existence or movement of a person/vehicle in a detected area in order to reduce administrative burden. However, there is limitation in video analysis because of image complexity, which can be found in an image of crowds or a downtown area, or a photographic condition, such as a light condition.

SUMMARY

The present disclosure aims to improve confidence of automatic video analysis by combining image information acquired from a camera and information acquired from a smart device.

The present disclosure also aims to reduce administrative burden and costs and quickly respond to an emergency situation by combining image information acquired from a camera and information acquired from a smart device and, if a preset condition is satisfied, giving notice to a user.

The present disclosure also aims to generate socio-demographic data by combining image information acquired from a camera and information acquired from a smart device, and promote efficient corporate usage of the socio-demographic data.

In one general aspect to achieve the aforementioned objectives, an intelligent video analysis system provides information on analysis of a video, by temporally and spatially matching the first data received from a camera with the second data received from a smart device.

The intelligent video analysis system may select information by temporally and spatially matching information received from a camera with information received from a smart device, and determine based on the selected information whether a security event-relevant condition is satisfied.

The intelligent video analysis system may select information temporally and spatially matching the first data received from a camera with the second data received from a smart device, and generate socio-demographic data from the selected information.

The intelligent video analysis system may output a security event and the socio-demographic data.

The intelligent video analysis system may provide information on analysis of the video by matching the first metadata received from the camera and the second metadata received from the smart device.

In another general aspect, an intelligent video analysis method includes selecting information by temporally and spatially matching information received from a camera with information received from a smart device, and generating socio-demographic data by determining based on the selected information whether a security event-relevant condition is satisfied.

The intelligent video analysis method may include outputting a security event and the socio-demographic data.

Other features and aspects may be apparent from the following detailed description, the drawings, and the claims.

Figure 1:
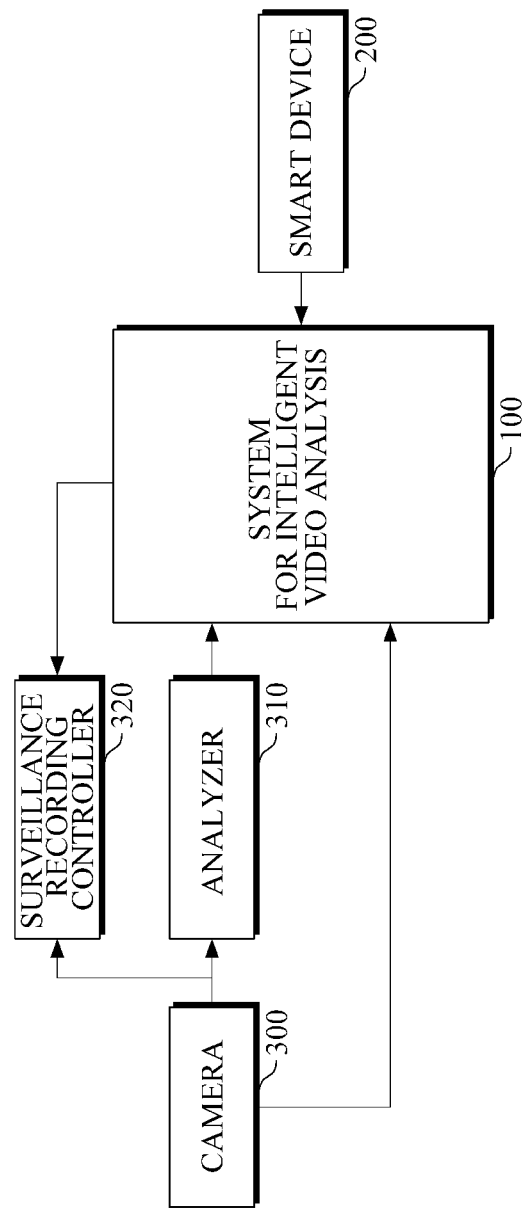
FIG. 1 is a block diagram illustrating a configuration of a surveillance system which has adapted an intelligent video analysis system according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a block diagram illustrating a block diagram illustrating a configuration of a surveillance system which has adapted an intelligent video analysis system according to an exemplary embodiment. According to an exemplary embodiment, an intelligent video analysis system 100 provides information on analysis of the video captured by the camera by spatially and temporally matching the first metadata extracted from a video captured by a camera 300 with the second metadata generated by a smart device 200 existing within a predetermined range distant from a location at which the camera 300 is set up. The predetermined range may be differently set by a user within a range where the smart device 200 is capable of communicating with the intelligent video analysis system 100.

In the example shown in FIG. 1, the camera 300 captures a video. For example, the camera 300 may be an Internet Protocol (IP) camera 200 or a CCTV.

In FIG. 1, an analyzer 310 generates the first metadata by analyzing a structure of a given video. Metadata is data about data. That is, metadata refers to information which is obtained by analyzing and classifying structural information and managed along with the structural information to add additional information. In the present disclosure, the additional information is information related to a captured video. For example, the analyzer 310 may be included in a server that is connected to an Internet Protocol (IP) camera on the Internet. In another example, the analyzer 310 may be connected to an analogue CCTV via a coaxial cable and may convert a received analogue video into a digital video and analyze the digital video.

The analyzer 310 separates an image into a necessary area and an unnecessary area. The unnecessary area is a background area, and is separated by calculating a difference in bright between a previous image and the current image or by performing modeling on feature information of the background area using Gaussian. After the separation, the analyzer 310 may provide information, for example, on what is a moving object in the necessary area among a person, an animal, a machine, and the like, and, if the moving object is a person, information as to whether the person is running or walking. In order to determine movement of an object, it is necessary to track a moving path of the object. There are well-known algorithms for tracking an object's moving path, such as Kalman Filter and Particle Filter. For example, the analyzer 310 generates the first metadata regarding color, size, speed, and a moving speed of an object, and transmits the first metadata to the intelligent video analysis system 100.

For example, the analyzer 310 is based on an edge-based scheme. In the edge-based scheme, an image is analyzed by a camera or an image encoder connected to a camera, without signal distortion which may occur while the image is compressed for transmission. In another example, the intelligent video analysis system 100 is based on a server-based scheme. In the server-based scheme, an image is received from a camera and the received image is analyzed. The server-based scheme is not dependent on the camera, so that it is easy to be applied to an existing system. In yet another example, the intelligent video analysis system 100 is based on a hybrid-based scheme which is a combination of the server-based scheme and the edge-based scheme.

In FIG. 1, a smart device 200, which is enabled to perform communication over a network and constantly collect and process information, is an object that is used in our daily lives. For example, the smart device 200 enables an intelligent relationship for sensing, networking, and information processing under a distributed environment through cooperation between an object, such as a vehicle, a book, and a fan, and humans/services. The smart device 200 may generate information on its own. For example, the smart device 200 may include a watch, a vehicle, or a stroller, and generate information on its own. The information generated by the smart device 200 may be a heartrate detected by a watch, which is information that helps assume an object. The smart watch 200 generates and outputs the second metadata that is information on its own. Technologies utilized by the smart device 200 include a sensing technology, a wireless/wired communication and network infrastructure technology, and an interface technology. The sensing technology includes conventional sensors, such as a temperature sensor, a humidity sensor, a heat sensor, a gas sensor, an illumination sensor, and an ultrasound sensor, and physical sensors, such as a remote sensor and an Synthetic Aperture Rader (SAR) sensor, that are enabled to obtain information from an tangible object and the surrounding environment. The wireless/wired communication and network infrastructure technology includes wireless/wired networks, such as Wireless Personal Area Network (WPAN), ZigBee, WiFi, 3G/4G/LTE, Bluetooth, and Ethernet, which are enabled to connect humans and object services.

In FIG. 1, a surveillance recording controller 320 is a surveillance video recorder, such as a Digital Video Recorder (DVR) and a Network Video Recorder (NVR). A DVR is referred to an electronic device or application software that records a video in a digital format and replaces a CCTV that is an analogue-type surveillance device. An NVR is referred to a video security system enabled to transmit, store, and monitor images of a target area using an Internet Protocol (IP) for a security purpose. The surveillance recording controller 320 is able to check and manage image information efficiently by receiving event related information set in the intelligent video analysis system 100 and recording a part which is related to occurrence of an event in an image received from the camera 300.

The intelligent video analysis system 100 matches the first metadata with the second metadata spatially and temporally. The second metadata acquired at around a point in time and a location at which an image is captured is taken into consideration for the analysis, along with the first metadata.

For example, in the case where a person on a wheelchair is captured by the camera 300, the intelligent video analysis system 100 acquires physical information about height, width, and a moving speed of an unspecific object from the camera 300. In addition, from the smart device 200, such as a wheelchair, which exists within a shooting range of the camera 300, the intelligent video analysis system 100 acquires information indicating that it is a person who is on the wheelchair and information on what kind of impediment the person on the wheelchair has. In another example, using a recognition algorithm, the intelligent video analysis system 100 acquires information indicating that an unspecific object in the image captured by the camera 300 is a person on a wheelchair. In addition, from the smart device 200, such as a wheelchair, which exists within a shooting range of the camera 300, the intelligent video analysis system 100 acquires information on what kind of impediment a person on the wheelchair has and how long the person is sit on the wheelchair.

In another example, using a recognition algorithm, the intelligent video analysis system 100 acquires information that a person has fallen down in an image captured by the camera 300. Using a smart device for measuring heartbeat, which the fallen person has attached, information on the person has fallen down because of myocardial infarction. The intelligent video analysis system 100 may further include a communicator. Through the communicator, information that the person has fallen down because of myocardial infarction to a control center in order to take an appropriate emergency measurement in time. The communicator performs wired/wireless communication with an external object. The communicator may include a technology required for wireless communication or a technology required for near field communication. The technology required for wireless communication may include wireless LAN, Wibro, Wifi, and Wi-max. The technology required for near field communication may include Bluetooth, Zigbee, Ultra Wideband (UWB), Radio Frequency Identification (RFID), and infrared communication.

The intelligent video analysis system 100 analyzes and provides specific information required by a user 500, thereby enhancing confidence of video analysis. The intelligent video analysis system 100 may be a program in a server connected to a camera over a network, or may be a program or a controller that is implemented by a processor of a camera.

Figure 2:
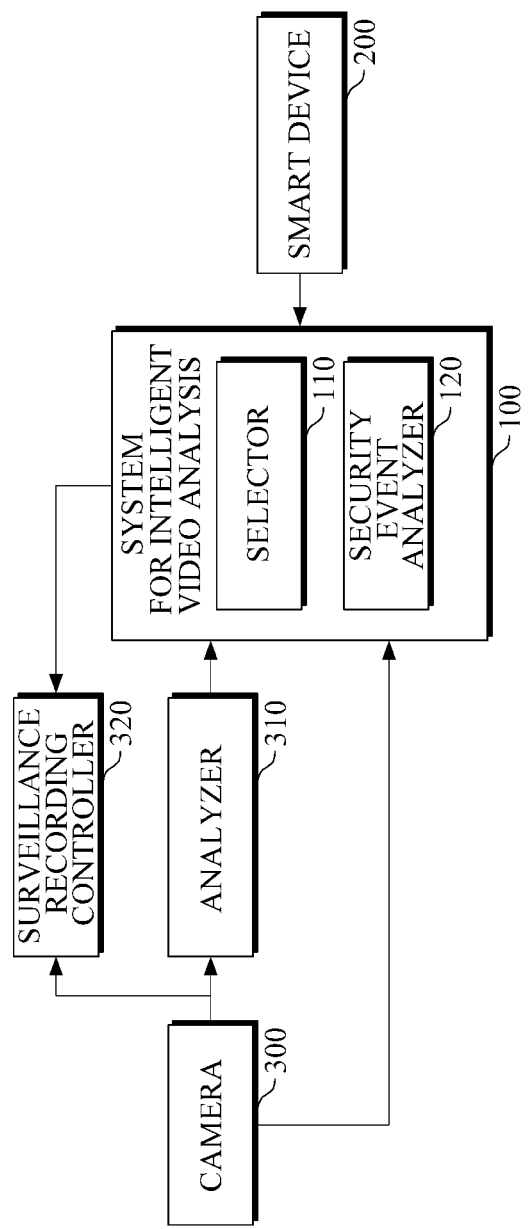
FIG. 2 is a block diagram illustrating an intelligent video analysis system f according to an exemplary embodiment.

FIG. 2 is a block diagram illustrating an intelligent video analysis system and method system according to an exemplary embodiment. According to an exemplary embodiment, an intelligent video analysis system 100 includes a selector 110 and a security event analyzer 120. The selector 110 selects the first and second metadata related to a point in time and a location that match a point in time and a location at which an image is captured by a camera 300. For example, information on a location at which the camera 300 is set up may be input to the intelligent video analysis system 100 upon the installation of the camera 300, may be received from a server which manages a locations of the camera 300, or may be received by the intelligent video analysis system 100 from the camera 300 in the case where the intelligent video analysis system 100 has a location sensor. Information on a location of a smart device 200 may be received from the smart device 200 in the case where the intelligent video analysis system 100 has a location sensor, may be input to the intelligent video analysis system 100 in the case where the smart device 200 is set up at a fixed location, or may be received from a server which manages the location of the smart device 200. For example, a location of the smart device 200 may be identified by an IP address of the smart device 200, base station location information using User Agent Profile, base station location information using Paging Request, Global Positioning System location information using latitude and longitude coordinates and Paging Request, location information using Zigbee, location information using WiFi, or Usim-based location information. As the camera 300 and the smart device 200 transmit time information to the intelligent video analysis system 100, only data which match each other in terms of both of an imaging time of the camera 300 and an information generating time of the smart device 200 may be selected. For example, time information regarding I-frame among MPEG image frames is managed using a time stamp. Each metadata is recorded along with a time stamp indicating an imaging time. The selector 110 controls time information and location information of the camera 300 to match time information and location information of the smart device 200, and selects particular second metadata that corresponds to the first metadata from the second metadata generated by the smart device 200.

The security event analyzer 120 analyzes an image captured by a selected camera 300, the first metadata that is a processed version of the image captured by the selected camera 300, and the second metadata generated by the smart device 200. A security-relevant condition may be set as a condition adequate for an environment that is necessary for a user. For example, security-relevant conditions may include comparison of a moving path and direction of an object with a path and direction set by a user, a broken glass, abrupt appearance or disappearance of an object, change in color of a specific object, movement of an object in a direction different than usual, a baggage left alone, and a vehicle being stopped. In addition, it is possible to detect a location and size of an object, and even an abnormal behavior, such as violence and abduction.

Figure 8:
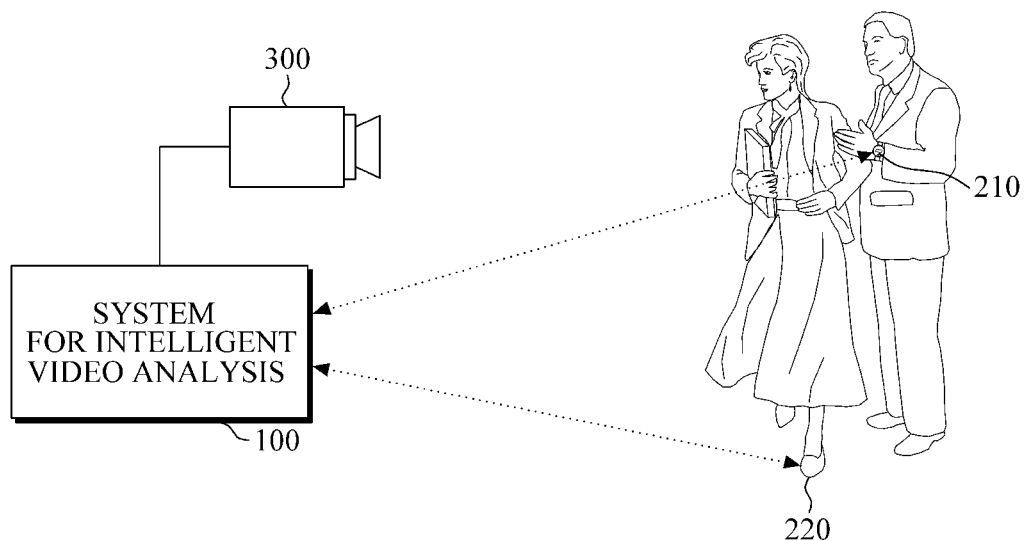
FIG. 8 is a diagram illustrating an example in which an intelligent video analysis system extracts a specific object from the crowds.

FIG. 8 is a diagram illustrating an example in which an intelligent video analysis system extracts a specific object from the crowds. FIG. 8 is described in conjunction with FIG. 1. For example, the analyzer 310 analyzes an image received from the camera 300 in a manner in which a three-dimensional (3D) space consisting of X and Y time axes are divided into cubes, feature information, such as movement change, of each cube is modeled, and a specific object is extracted through statistical analysis on association between the cubes.

Since the intelligent video analysis system 100 receives the second metadata from the smart device 200, the intelligent video analysis system 100 is able to extract an object easily. In FIG. 8, a smart shoe 220 of a person close to the camera 300 and a smart watch 210 of a person distant from the camera 300 transmit metadata to each other. Even though the two people overlap in an image captured by the camera 300 to be seen as a single object, it is possible to know that the object is two people based on the metadata transmitted from the smart shoe and the smart watch, and to identify who satisfies a preset condition. That is, the analysis is performed considering an image from the camera 300, the first metadata, and the second metadata, it is possible to precisely determine whether a preset security-relevant condition is satisfied.

Figure 3:
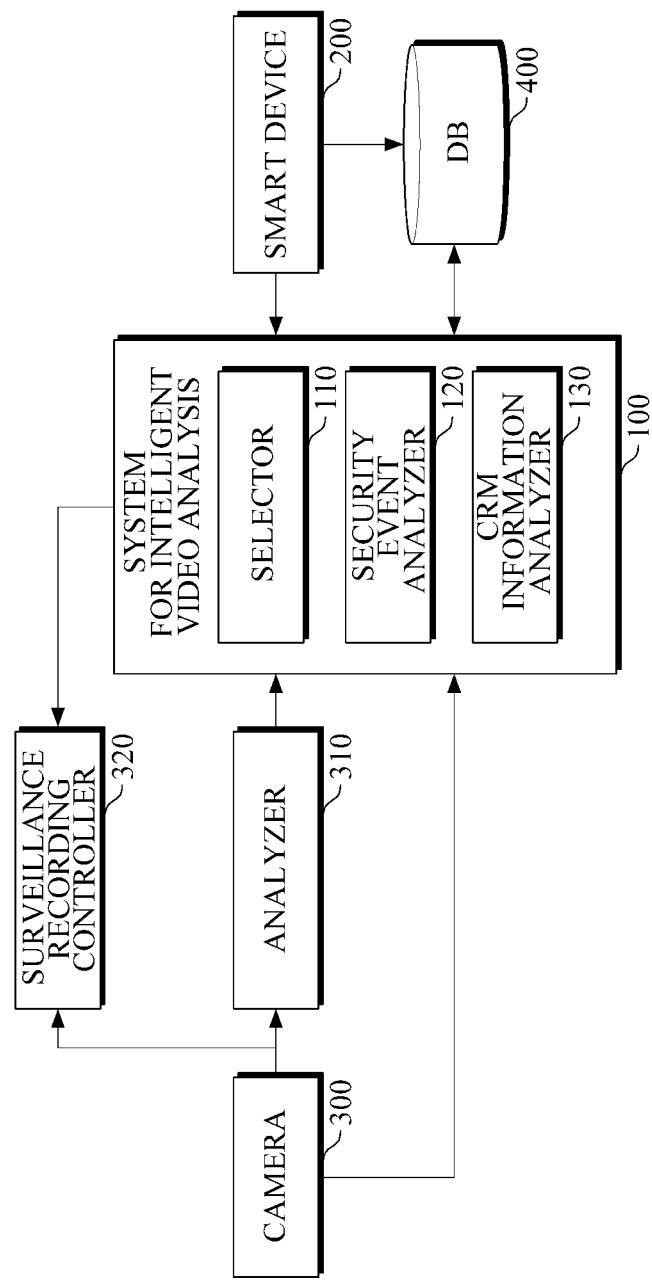
FIG. 3 is a block diagram illustrating an intelligent video analysis system according to another exemplary embodiment.

FIG. 3 is a block diagram illustrating an intelligent video analysis system according to another exemplary embodiment. According to an exemplary embodiment, an intelligent video analysis system 100 may further include a Customer Relationship Management (CRM) information analyzer 130.

The CRM information analyzer 130 generates socio-demographic data in response to a request from a user by analyzing the first metadata acquired from an image captured by a camera 300 and the second metadata generated by a smart device 200. According to an exemplary embodiment, the intelligent video analysis system 100 may acquire the second metadata from a smart device 200, such as a smart phone, and the first metadata, such as cloth color, from a camera 300. The intelligent video analysis system 100 acquires information on what kind of color of cloths a person having a high price smart phone usually wears. CRM is an approach to managing a company's interaction with current and future customers and maintaining an existing relationship with the current customers. The socio-demographic data is information which, for example, enables identifying characteristics of a specific group, such as a moving pattern of a customer, a moving time, staying time, a demographic density in a specific area, a floating population, income level, and spatial utilization. In the case where an image captured by the camera 300, the first metadata, and the second metadata are integratedly analyzed and data resulted from the analysis is accumulated in a database (DB) 400, it is possible to generate specific information useful for corporations, which cannot be expected when using only the image captured by the camera 300.

The DB 400 manages the second metadata generated by the smart device 200, an image captured by the camera 300, the first metadata generated by the analyzer 300, and the third metadata generated by the intelligent video analysis system 100. The intelligent video analysis system 100 may need to provide statistic information which is a result of analysis and accumulated for a predetermined time period, and thus, such information are stored in the DB 400.

Figure 4:
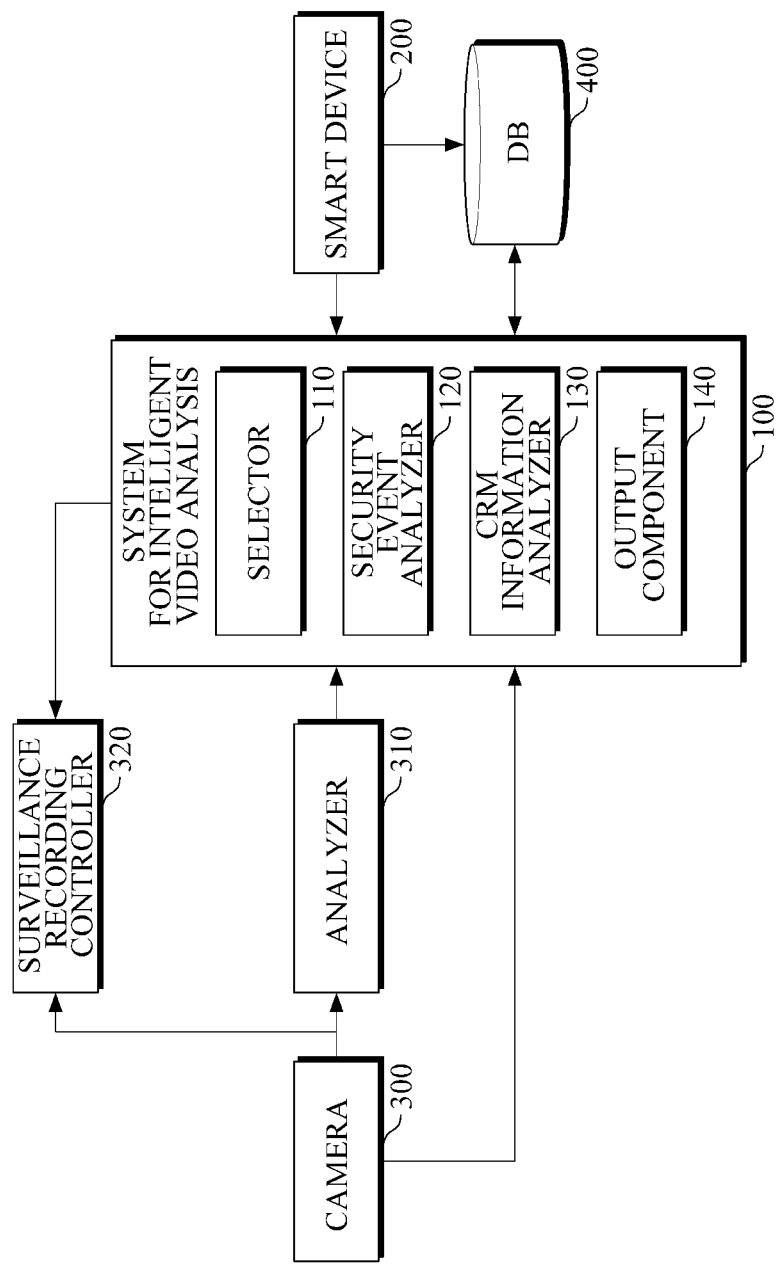
FIG. 4 is a block diagram illustrating an intelligent video analysis system according to yet another exemplary embodiment.

FIG. 4 is a block diagram illustrating an intelligent video analysis system according to an exemplary embodiment. According to an exemplary embodiment, an intelligent video analysis system 100 may further include an output component 140. The output component 140 displays whether a security-relevant condition is satisfied in a security event analyzer 120. In addition, the output component 140 displays socio-demographic data, which is generated by a CRM information analyzer 130 and mapped according to categories, and displays the result. The socio-demographic data may be variously classified by a category, such as age, time, and gender, and may be provided in a schematic form, such as a graph, in response to a specific request. The output component 140 is one of a monitor, a printer, and the like.

Figure 5:
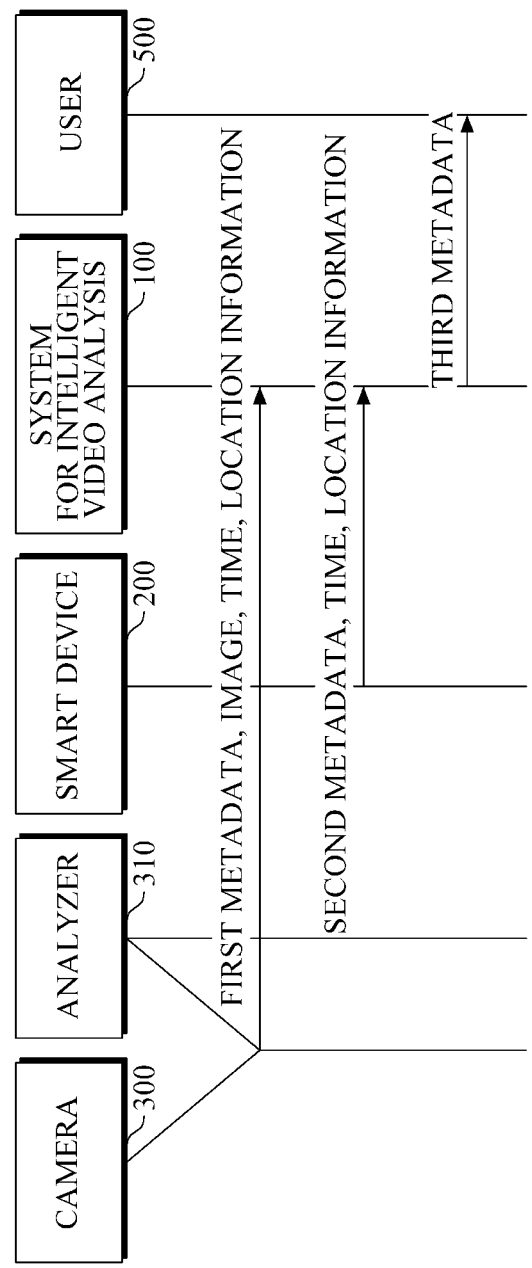
FIG. 5 is a flowchart illustrating an intelligent video analysis method according to an exemplary embodiment.

FIG. 5 is a flowchart illustrating an intelligent video analysis method according to an exemplary embodiment. FIG. 5 is described in conjunction with FIG. 1. According to an exemplary embodiment, the intelligent video analysis method analyzes and provides a preset event by matching the first metadata acquired from an image captured by the camera 300 and the second metadata generated by the smart device 200 existing in a shooting range of the camera 300.

In FIG. 5, the intelligent video analysis system 100 receives data from the camera, the analyzer 310, and the smart device 200. The first metadata may be, for example, image information acquired from the camera 300 when the camera 300 captures a person on a wheelchair. The image information acquired from the camera 300 may be physical information on height, width, and a moving direction of an unspecific object. For example, in the case where a person on a wheelchair is captured by the camera 300, the intelligent video analysis system 100 acquires physical information about height, width, and a moving speed of an unspecific object from the camera 300. In addition, the intelligent video analysis system 100 acquires, from the smart device 200, such as a wheelchair, located within a shooting range of the camera 300, information that it is a person who is on the wheelchair and information on what kind of impediment the person on the wheelchair has. In another example, using a recognition algorithm, the intelligent video analysis system 100 acquires, from the smart device 200, such as a wheelchair, which exists within a shooting range of the camera 300, image information indicating that an unspecific object in the image captured by the camera 300 is a person on a wheelchair. In addition, from the smart device 200, such as a wheel chair, which exists within a shooting range of the camera 300, the intelligent video analysis system 100 acquires information on what kind of impediment a person on the wheelchair has and how long the person is sit on the wheelchair.

In another example, using a recognition algorithm, the intelligent video analysis system 100 acquires information indicating that a person has fallen down in an image captured by the camera 300. Information that the person has fallen down because of myocardial infarction is acquired using a smart device 200 that is attached on the person to measure heartbeats. The intelligent video analysis system 100 may further include a communicator. Through the communicator, information that the person has fallen down because of myocardial infarction is transmitted to a control center in order to take an appropriate emergency measurement in time. The intelligent video analysis method analyzes specific information requested by a user 500 and provides a result of the analysis, thereby enhancing confidence of video analysis.

Figure 6:
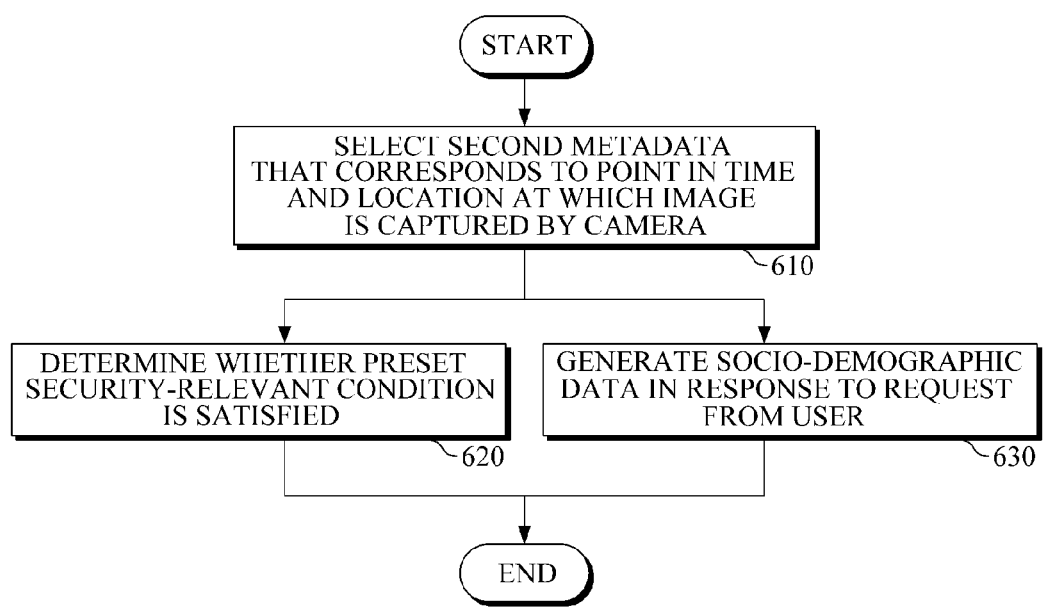
FIG. 6 is a flowchart illustrating operations for selection, analysis of a security event, and analysis of Customer Relationship Management (CRM) information in an intelligent video analysis method according to an exemplary embodiment.

FIG. 6 is a flowchart illustrating operations for selection, analysis of a security event, and analysis of CRM information in an intelligent video analysis method according to an exemplary embodiment. FIG. 6 is described in conjunction with FIG. 1.

In 610, the intelligent video analysis system 100 selects the first and second metadata related to a point in time and a location that match a point in time and a location at which an image is captured by the camera 300. For example, information on a location at which the camera 300 is set up may be input to the intelligent video analysis system 100 upon the installation of the camera 300, may be received from a server which manages a location of the camera 300, or may be received by the intelligent video analysis system 100 from the camera 300 in the case where the intelligent video analysis system 100 has a location sensor. Information on a location of a smart device 200 may be received from the smart device 200 in the case where the intelligent video analysis system 100 has a location sensor, may be input to the intelligent video analysis system 100 in the case where the smart device 200 is installed at a fixed location, or may be received from a server which manages the location of the smart device 200. For example, a location of the smart device 200 may be identified by an IP address of the smart device 200, base station location information using User Agent Profile, a base station location information using Paging Request, Global Positioning System location information using latitude and longitude coordinates and Paging Request, location information using Zigbee, location information using WiFi, or Usim-based location information.

As the camera 300 and the smart device 200 transmits time information to the intelligent video analysis system 100, only data matching each other in terms of both of an imaging time of the camera 300 and an information generating time of the smart device 200 may be selected. For example, time information regarding I-frame among MPEG image frames is managed by a time stamp. Each metadata is recorded along with a time stamp indicating an imaging time. The selector 110 controls time information and location information of the camera 300 to match time information and location information of the smart device 200, and selects particular second metadata that corresponds to the first metadata from the second metadata generated by the smart device 200.

In 620, the intelligent video analysis system 100 analyzes an image captured by a camera 300 selected in operation 610, the first metadata that is a processed version of the image captured by the selected camera 300, and the second metadata generated by the smart device 200. A security-relevant condition may be set as a condition adequate for an environment that is necessary for a user. For example, security-relevant conditions may include comparison of a moving path and direction of an object with a path and direction set by a user, a broken glass, abrupt appearance or disappearance of an object, change in color of a specific object, movement of an object in a direction different than usual, a baggage left alone, and a vehicle being stopped. In addition, it is possible to detect a location and size of an object, and even an abnormal behavior, such as violence and abduction.

FIG. 8 is a diagram illustrating an example in which a specific object is extracted from the crowds by using an intelligent video analysis method. For example, in an analyzing operation, the intelligent video analysis system 100 analyzes an image input from the camera 300 in a manner in which a 3D space consisting of X and Y time axes are divided into cubes, feature information, such as movement change, of each cube is modeled, and a specific object is extracted through statistical analysis on association between the cubes.

In the intelligent video analysis method according to an exemplary embodiment, an object may be extracted easily because the second metadata is received from a smart device. In FIG. 8, a smart shoe of a person close to the camera 300 and a smart watch of a person distant from the camera 300 transmit metadata to each other. Even though the two people are overlap in an image captured by the camera 300 to be seen as a single object, it is possible to know that the object is two people based on the metadata transmitted from the smart shoe and the smart watch, and to identify who satisfies a preset condition. That is, the analysis is performed considering an image from the camera 300, the first metadata, and the second metadata, it is possible to precisely determine whether a preset security-relevant condition is satisfied.

In 630, the intelligent video analysis system 100 generates socio-demographic data in response to a request from a user by analyzing the second metadata and at least one of a selected image and the first metadata to. According to an exemplary embodiment, the intelligent video analysis system 100 acquires the second metadata from a smart device 200, such as a smart phone, and the first metadata, such as cloth color, from a camera 300. The intelligent video analysis system 100 acquires information on what kind of color of cloths a person having a high price smart phone usually wears. CRM is an approach to managing a company's interaction with current and future customers and maintaining an existing relationship with the current customers. The socio-demographic data is information which, for example, enables identifying characteristics of a specific group, such as a moving pattern of a customer, a moving time, staying time, a demographic density in a specific area, a floating population, income level, and spatial utilization. In the case where an image captured by the camera 300, the first metadata, and the second metadata are integratedly analyzed and data resulted from the analysis is accumulated in the DB 400, it is possible to generate specific information useful for corporations, which cannot be expected when using only the image captured by the camera 300.

Figure 7:
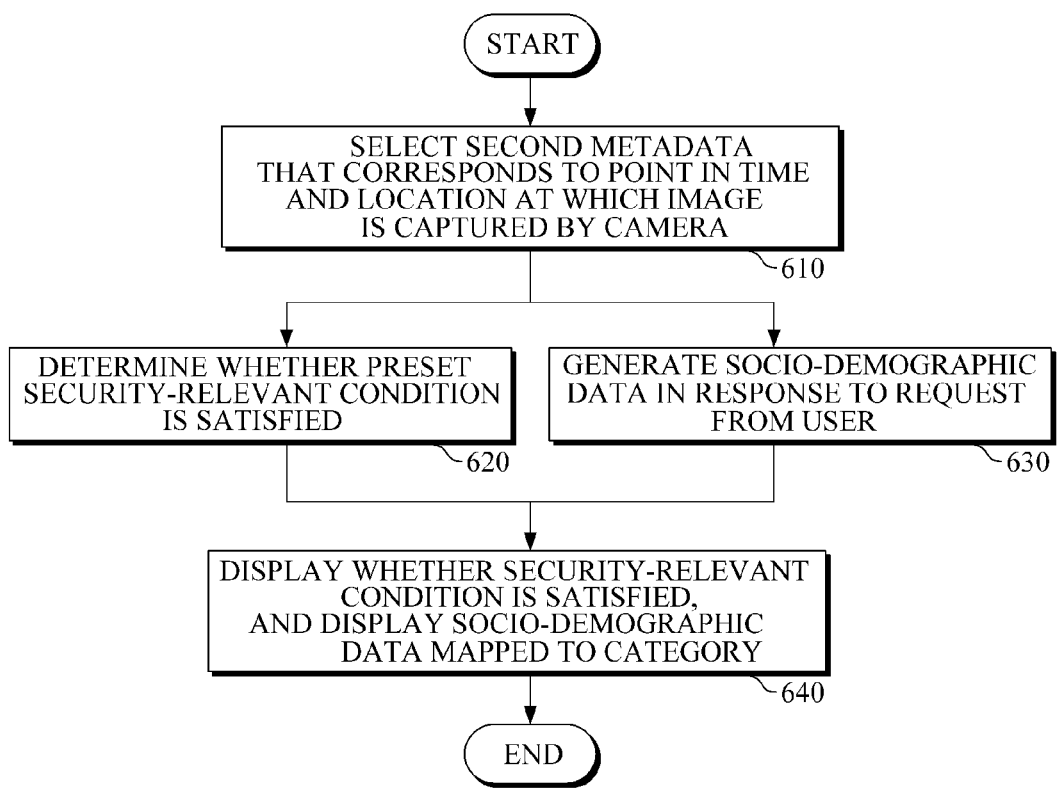
FIG. 7 is a flowchart illustrating an output operation in an intelligent video analysis method according to an exemplary embodiment.

FIG. 7 is a flowchart illustrating an output operation in an intelligent video analysis method according to an exemplary embodiment. The intelligent video analysis method shown in FIG. 7 further includes an outputting operation in addition to the operations in the intelligent video analysis method shown in FIG. 6. In 640, whether a security-relevant condition is satisfied in operation 620 is displayed, and socio-demographic data, which are generated in operation 630 and mapped according to categories, are displayed. The socio-demographic data may be classified in various ways according to a category, such as age, time, gender, and the like, and thus, the socio-demographic data may be provided in a schematic form, such as a graph, in response to a specific request. The socio-demographic data may be output through a monitor, a print, and the like.

The present disclosure improves confidence of automatic video analysis. In addition, the present disclosure helps reduce administrative burden and costs and respond to an emergency situation. The present disclosure generates socio-demographic data from surveillance information and promote corporate usage of the socio-demographic data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An intelligent video analysis system for providing information on analysis of a video captured by a camera by spatially and temporally matching first metadata acquired from an image captured by the camera with second metadata generated by a smart device existing within a predetermined range distant from a location at which the camera is set up,
wherein the intelligent video analysis system comprises,
a selector configured to select the second metadata that corresponds to a point in time and a location at which the image is captured by the camera;
a security event analyzer configured to determine whether a preset security-relevant condition is satisfied, by analyzing the first metadata and the selected second metadata; and
a Customer Relationship Management (CRM) information analyzer configured to generate socio-demographic data in response to a request from a user, by analyzing the first metadata and the selected second metadata,
wherein the selector controls time information and location information of the camera to match time information and location information of the smart device, and selects particular second metadata that corresponds to the first metadata from the second metadata generated by the smart device.

2. The intelligent video analysis system of claim 1, further comprising:
an output component configured to display a determination made by the security event analyzer as to whether the preset security-relevant event condition is satisfied, and display the socio-demographic data which are generated by the CRM information analyzer and mapped according to categories.

3. An intelligent video analysis method for providing information on analysis of an image captured by a camera by spatially and temporally matching first metadata acquired from the image captured by the camera with second metadata generated by a smart device existing within a predetermined range distant from a location at which the camera is set up,
wherein the intelligent video analysis method comprises,
selecting the second metadata that corresponds to a point in time and a location at which the image is captured by the camera;
determining whether a preset security-relevant condition is satisfied, by analyzing the first metadata and the selected second metadata; and
generating socio-demographic data in response to a request from a user, by analyzing the first metadata and the selected second metadata,
wherein the selecting of the second metadata comprises controlling time information and location information of the camera to match time information and location information of the smart device, and selecting particular second metadata that corresponds to the first metadata from the second metadata generated by the smart device.

4. The intelligent video analysis method of claim 3, further comprising:
displaying a determination as to whether the present security-relevant condition is satisfied, and displaying the socio-demographic data which is mapped according to categories.

* * * * *